United States Patent
Anshul et al.

(10) Patent No.: US 11,080,034 B2
(45) Date of Patent: Aug. 3, 2021

(54) INTELLIGENT BURN PLANNING

(71) Applicant: Dell Products L.P., Round Rock, TX (US)

(72) Inventors: Shanir Anshul, Hyderabad (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/575,816

(22) Filed: Sep. 19, 2019

(65) Prior Publication Data

US 2021/0089287 A1    Mar. 25, 2021

(51) Int. Cl.
*G06F 8/61* (2018.01)
*G06N 5/04* (2006.01)

(52) U.S. Cl.
CPC ...... *G06F 8/61* (2013.01); *G06N 5/04* (2013.01)

(58) Field of Classification Search
CPC . G06F 8/61; G06N 5/04; G06Q 10/06; G06Q 50/04; Y02P 90/30
USPC ............. 717/171; 700/109, 110; 714/38; 324/500
See application file for complete search history.

(56) References Cited

U.S. PATENT DOCUMENTS

| | | | | |
|---|---|---|---|---|
| 5,805,898 A | * | 9/1998 | Bareness et al. | ......... G06F 8/61 717/175 |
| 2004/0210884 A1 | * | 10/2004 | Raghavachari et al. | ..................... G06F 9/44505 717/158 |
| 2011/0035042 A1 | * | 2/2011 | Henrichsen et al. | .. G06Q 10/06 700/110 |

* cited by examiner

*Primary Examiner* — Wei Y Zhen
*Assistant Examiner* — Mohammed N Huda
(74) *Attorney, Agent, or Firm* — Jackson Walker L.L.P.

(57) ABSTRACT

An information handling system may include a processor and a memory communicatively coupled to the processor. The information handling system may be configured to: receive, for each of a plurality of target information handling systems, information regarding software to be burned to the respective target information handling system; receive, for each of the target information handling systems, information regarding testing time; based on a statistical analysis of the information regarding the testing time, determine a predicted burn time for each target information handling system; and based on the respective predicted burn times, determine a desired order in which the target information handling systems are to be burned with the software.

13 Claims, 8 Drawing Sheets

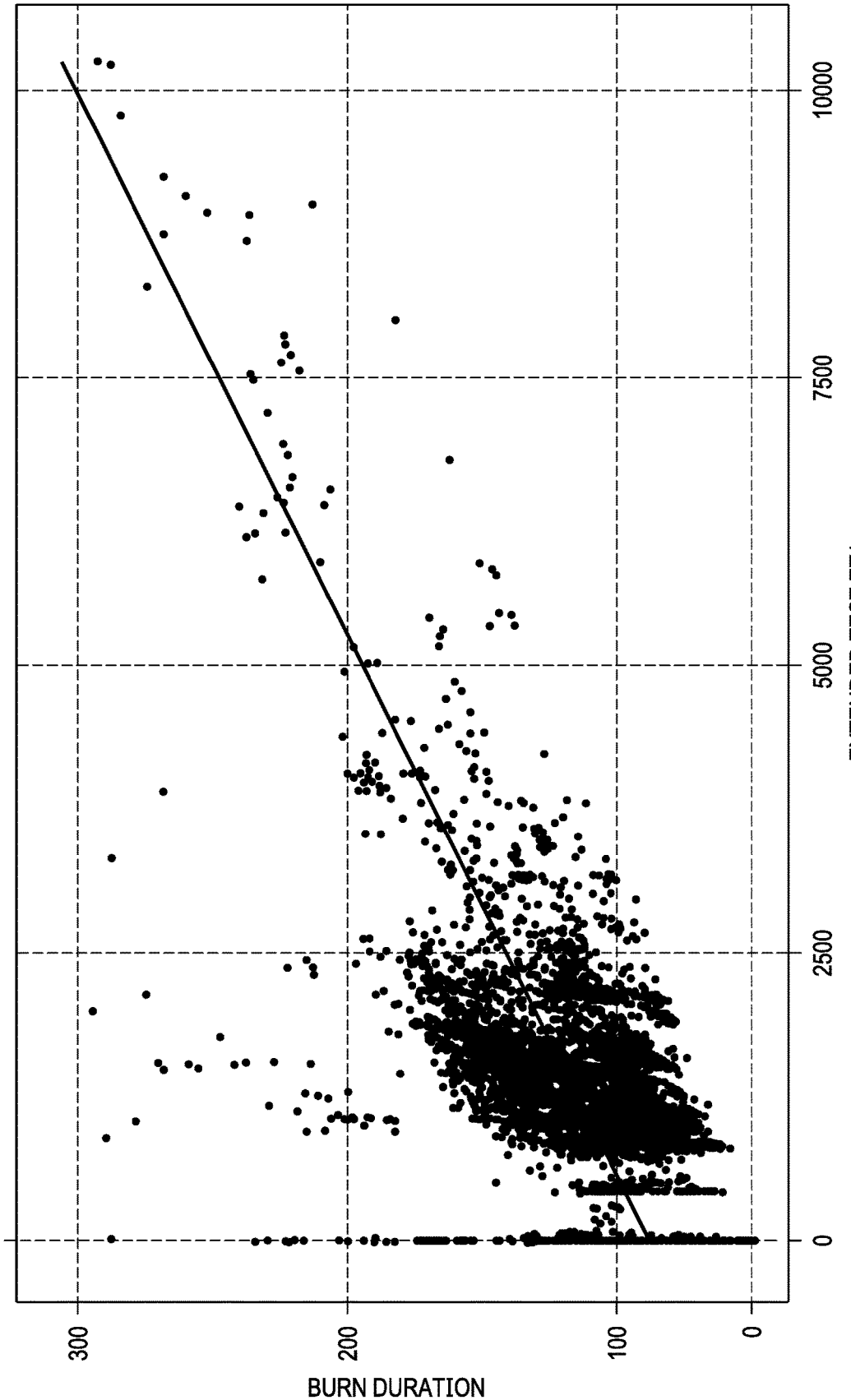

| REQUEST ID | CLASSIFICATION NAME | INPUT | | | PREDICTED | | |
|---|---|---|---|---|---|---|---|
| | | QUANTITY | REQUEST TIME | FACILITY SHIP TIME | TEST TIME (H:M:S) | BURN TIME (H:M:S) | MANUFACTURING BUILD TIME (H:M:S) |
| R1 | SERVICE TAG 1 | 3 | 10/16/2018 9:02 | 10/16/2018 21:00 | 0:41:19 | 3:21:12 | 5:21:39 |
| R2 | SERVICE TAG 2 | 5 | 10/16/2018 9:02 | 10/16/2018 21:00 | 1:39:15 | 3:34:12 | 6:04:12 |
| R3 | SERVICE TAG 3 | 2 | 10/16/2018 9:02 | 10/16/2018 21:00 | 0:57:29 | 2:56:42 | 5:56:42 |
| R4 | SERVICE TAG 4 | 2 | 10/16/2018 9:02 | 10/16/2018 21:00 | 0:55:07 | 2:12:45 | 6:18:25 |
| R5 | SERVICE TAG 5 | 7 | 10/16/2018 9:02 | 10/16/2018 21:00 | 1:41:49 | 2:51:32 | 5:59:32 |
| R6 | SERVICE TAG 6 | 2 | 10/16/2018 9:02 | 10/16/2018 21:00 | 1:39:15 | 3:34:12 | 6:04:12 |
| R7 | SERVICE TAG 7 | 2 | 10/16/2018 9:02 | 10/16/2018 21:00 | | | |
| R8 | SERVICE TAG 8 | 4 | 10/16/2018 9:02 | 10/16/2018 21:00 | | | |
| R9 | SERVICE TAG 9 | 5 | 10/16/2018 9:02 | 10/16/2018 21:00 | | | |

EXPECTED UNIT BUILD TIME ONCE BURN COMPLETED

Annotations:
- SUM OF PREDICTED TEST TIME, ET1 STANDARD DEVIATION, AND ET2 STANDARD DEVIATION → (TEST TIME column)
- SUM OF PREDICTED BURN AND BURN STANDARD DEVIATION → (BURN TIME column)
- MANUFACTURING BUILD TIME IS MORE FOR R1 THUS BURN NEED TO START EARLY → (SHIP TIME column)
- SHORTEST TEST (ET1 AND ET2) TIME IS EXPECTED TO ARRIVE FIRST ON RACK → (ARRIVAL SEQUENCE ON BURN RACK)
- HIGHER THE VALUE WILL HAVE HIGHEST PRIORITY → (BURN PRIORITY)
- IF ANY FAILURE ENCOUNTERED THEN INCREMENT THE VALUE AND RESET EXPECTED TEST/BURN TIME → (TEST/BURN FAIL COUNT)

| TEST/ BURN FAIL COUNT | EXPECTED BURN END TIME ON RACK | ET1 STANDARD DEVIATION | ET2 STANDARD DEVIATION | BURN STANDARD DEVIATION | CALCULATED | | EXPECTED | | PRIORITY |
|---|---|---|---|---|---|---|---|---|---|
| | | | | | TEST TIME (H:M:S) | BURN TIME (H:M:S) | ARRIVAL SEQUENCE ON BURN RACK | SHIP TIME - (BUILD TIME +BURN TIME +TEST TIME) | BURN PRIORITY |
| 0 | | 0:11:34 | 0:03:45 | 0:51:45 | 0:56:38 | 4:54:16 | 1 | 9:47:27 | 1 |
| 0 | | 0:08:15 | 0:12:23 | 0:48:23 | 1:59:53 | 6:01:50 | 4 | 6:54:05 | 5 |
| 0 | | 0:07:15 | 0:09:15 | 0:31:15 | 1:13:59 | 4:25:26 | 2 | 9:23:53 | 2 |
| 0 | | 0:13:41 | 0:13:41 | 0:53:41 | 1:22:29 | 4:01:33 | 3 | 9:17:33 | 3 |
| 0 | | 0:10:12 | 0:14:35 | 0:21:35 | 2:06:36 | 4:54:56 | 6 | 7:58:56 | 4 |
| 0 | 10/16/2018 12:02 | 0:12:53 | 0:11:23 | 0:51:23 | 2:03:31 | 6:04:50 | 5 | 6:47:27 | 6 |
| 1 | 10/16/2018 11:48 | | | | | | | | |
| 0 | 10/16/2018 11:54 | | | | | | | | |

FROM FIG. 5A

|  | SLOT A | SLOT B | SLOT C |
|---|---|---|---|
| ROW 01 | 10/16/2018 12:02 |  | 10/16/2018 11:54 |
| ROW 02 |  | 10/16/2018 11:48 |  |
| ROW 03 |  | 10/16/2018 11:48 | 10/16/2018 11:54 |
| ROW 04 |  |  | 10/16/2018 11:54 |
| ROW 05 |  | 10/16/2018 11:48 |  |
| ROW 06 | 10/16/2018 12:02 | 10/16/2018 11:48 | 10/16/2018 11:54 |
| ROW 07 |  |  | 10/16/2018 11:54 |

OCCUPIED - 2 UNITS AND EXPECTED TO BE FINISHED BY 12:02 PM
AVAILABLE - 5 NEW UNITS CAN BE LOADED

OCCUPIED - 3 UNITS AND EXPECTED TO BE FINISHED BY 11:48 AM
AVAILABLE - 3 NEW UNITS CAN BE LOADED ⇨ FIRST POSSIBLE NEW AVAILABLE SPACE

OCCUPIED - 5 UNITS AND EXPECTED TO BE FINISHED BY 11:54 AM
AVAILABLE - 2 NEW UNITS CAN BE LOADED ⇨ SECOND POSSIBLE NEW AVAILABLE SPACE

FIG. 7

INTELLIGENT BURN PLANNING

TECHNICAL FIELD

The present disclosure relates in general to information handling systems, and more particularly to efficiently installing and configuring software in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

After an information handling system has been physically built (e.g., by a manufacturer), it may need to have software installed and configured before it can be delivered. This process of installing software on a newly built information handling system is referred to herein as "burning." In various embodiments, burning may include copying a software image to the system, extracting files, executing installation scripts and/or executables, performing software customizations, and/or any subset thereof. In some embodiments, an information handling system or group of such systems may be inserted into a "burn rack" to carry out the burning. Efficient utilization of the limited number of locations within a burn rack contributes greatly to overall manufacturing throughput.

A problem has arisen in that existing methods for performing software burn can require lengthy and unpredictable amounts of time. Further, timing requirements (e.g., desired shipment dates) for particular systems or groups of systems may further complicate matters, as may the time required for testing.

Any failures in testing or burning may increase the dwell time for information handling systems in burn racks, reducing overall throughput.

Existing burn planning systems are typically somewhat ad hoc, relying on subject matter experts with knowledge of expected burn time to perform manual calculations regarding burn rack utilization. Embodiments of this disclosure may utilize predicted burn time and component test time in order to make the process more efficient and more easily automated.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with installing and configuring software in an information handling system may be reduced or eliminated.

In accordance with embodiments of the present disclosure, an information handling system may include a processor and a memory communicatively coupled to the processor. The information handling system may be configured to: receive, for each of a plurality of target information handling systems, information regarding software to be burned to the respective target information handling system; receive, for each of the target information handling systems, information regarding testing time; based on a statistical analysis of the information regarding the testing time, determine a predicted burn time for each target information handling system; and based on the respective predicted burn times, determine a desired order in which the target information handling systems are to be burned with the software.

In accordance with these and other embodiments of the present disclosure, a method may include: an information handling system receiving, for each of a plurality of target information handling systems, information regarding software to be burned to the respective target information handling system; the information handling system receiving, for each of the target information handling systems, information regarding testing time; based on a statistical analysis of the information regarding the testing time, the information handling system determining a predicted burn time for each target information handling system; based on the respective predicted burn times, the information handling system determining a desired order in which the target information handling systems are to be burned with the software; and the information handling system causing the target information handling systems to be burned in the desired order.

In accordance with these and other embodiments of the present disclosure, an article of manufacture may include a non-transitory, computer-readable medium having computer-executable code thereon that is executable by a processor of an information handling system for: receiving, for each of a plurality of target information handling systems, information regarding software to be burned to the respective target information handling system; receiving, for each of the target information handling systems, information regarding testing time; based on a statistical analysis of the information regarding the testing time, determining a predicted burn time for each target information handling system; and based on the respective predicted burn times, determining a desired order in which the target information handling systems are to be burned with the software.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates an example scatter plot and linear regression, in accordance with embodiments of the present disclosure;

FIG. 5 illustrates an example data table, in accordance with embodiments of the present disclosure;

FIG. 7 illustrates a block diagram of an example set of burn rack locations, in accordance with embodiments of the present disclosure.

DETAILED DESCRIPTION

Figure 1:
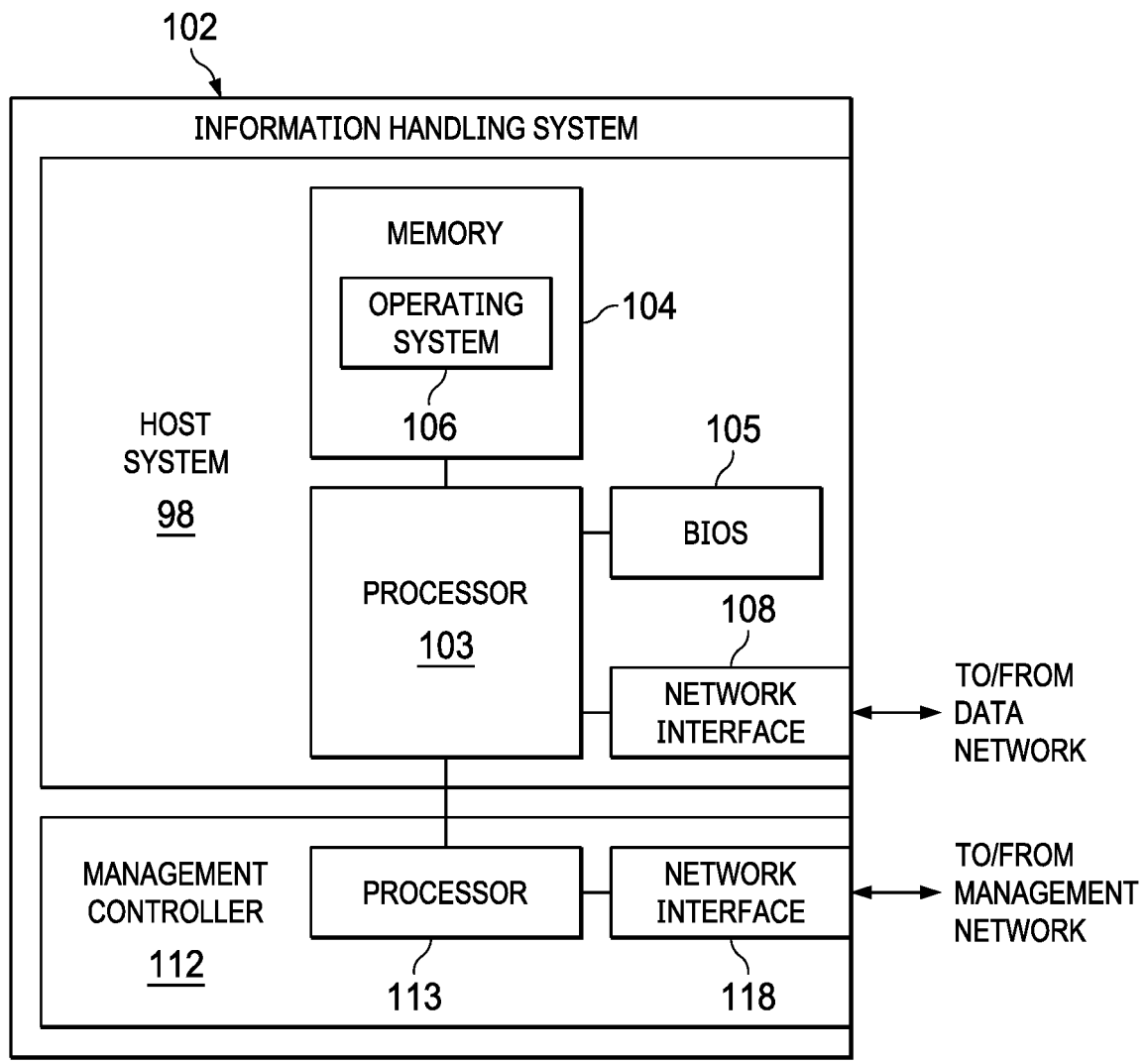
FIG. 1 illustrates a block diagram of an example information handling system, in accordance with embodiments of the present disclosure.

Preferred embodiments and their advantages are best understood by reference to FIGS. 1 through 7, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system (OS) 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, newly constructed information handling systems may typically need to have software burned before they can be delivered to a buyer. Embodiments of this disclosure may provide for determining (e.g., via an information handling system such as information handling system 102) a more efficient process for doing so. In these and other embodiments, the process of burning software to a plurality of "target" information handling systems may be automated via an information handling system such as information handling system 102.

For example, the order in which target information handling systems receive their software may be optimized to reduce the overall burning time. In some embodiments, this may be accomplished by burning the target information handling systems in an order that is determined such that systems having the same (or similar) predicted burn finish times will be burned concurrently.

Figure 2:
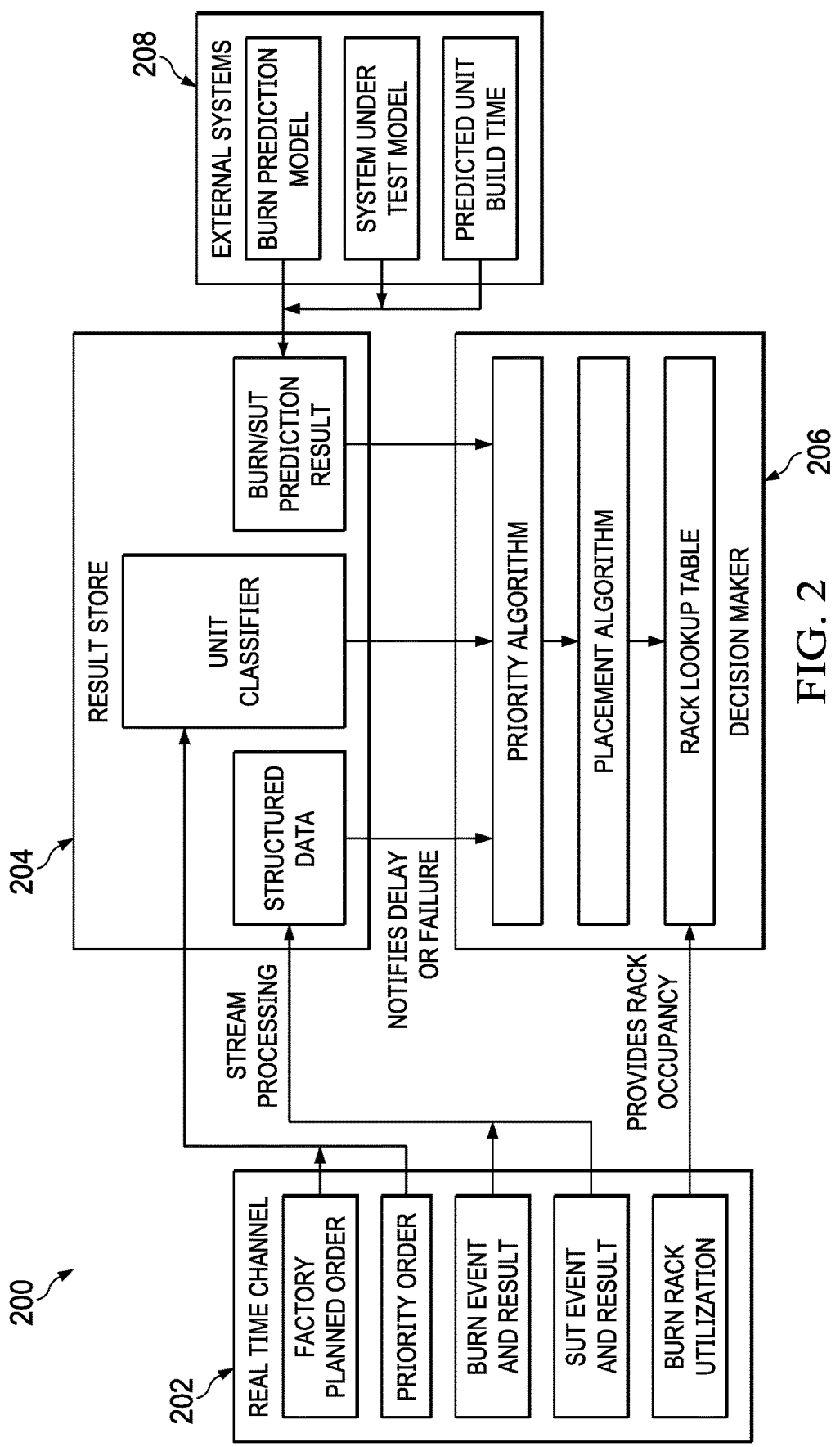
FIG. 2 illustrates a block diagram of an example architecture, in accordance with embodiments of the present disclosure.

Turning now to FIG. 2, a block diagram of a system architecture is shown, in accordance with some embodiments.

As shown in FIG. 2, decision maker module 206 may be the core engine configured to define the priority of incoming burn requests, as well as to help to allocate space efficiently on burn rack(s). Real time channel module 202 may be configured to interface with and accept messages from various sources (e.g., factory planning and operation messages). Result store module 204 may include a storage mechanism to hold predicted values and real-time processed information, providing feedback to the overall burn planning engine. Finally, external systems 208 may also provide input to result store module 204 such as expected burn time, test time, and manufacturing time for each order. As shown, any or all of these various data sources may be combined within the priority algorithms of decision maker module 206 in order to define the priority of each unit classification (which may refer to a logical name for a group of models or service tags having the same or similar test and burn time). In addition to defining the priority ordering, decision maker module 206 may also determine an efficient way of populating the available burn rack locations.

Real time channel module 202 may include, for example, information regarding a factory planned order (e.g., a list of orders from a factory planning system indicating what needs to be built within a specified time). Real time channel module 202 may further include information regarding a priority order (e.g., a business-defined ordering of priorities). Real time channel module 202 may further include information regarding burn events and results (e.g., events generated by the burn system to provide insight on software burn progress on the burn rack). Real time channel module 202 may further include information regarding system unit test events and results. Finally, real time channel module 202 may include information regarding burn rack utilization.

External systems 208 may provide data regarding predicted burn times (based on a burn prediction model), predicted test times (based on a system unit test model), and predicted unit build time for how long the assembly of each system is likely to take.

In general, any type of testing may be used to validate hardware, software, firmware, etc. of an information handling system. In some embodiments, hardware tests may be used and may be conducted prior to burning. For the sake of concreteness within this disclosure, three sets of testing are referred to: a quick test (QT), an extended test 1 (ET1), and an extended test 2 (ET2). Typically, different types of testing may be grouped into ET1 versus ET2. For example, in some embodiments, ET1 may focus mostly on storage media, and ET2 may focus mostly on network issues. As discussed in more detail below, correlations may exist between the amounts of time required for different types of test and the amount of time required for software burning. These correlations may be exploited in some embodiments to arrive at more accurate estimates for predicted burn times. In these and other embodiments, an AI-based system may define a priority for the units that need to be burned first by taking into account the predicted burn time and the predicted test time of any given type of unit.

Raw data (e.g., factory planned order, business defined priority orders, manufacturing operational data such as burn and test status) may be fed into result store module 204. The result store module 204 may use unit classifiers to classify input data by defining similarities (e.g., time to burn or time to test) based on characteristics of information handling systems such as the line of business, system family, OS type, OS part number, and physical configuration information such as hard drive size and speed, RAM, CPU speed, etc.

This processed data from result store module 204 may then be passed to decision maker module 206 to decide which unit to burn first. Decision maker module 206 may execute various algorithm to prioritize each unit classification. Decision maker module 206 also may rely on external system 208 to provide input such as expected burn time, test time, and projected unit build time.

Upon analyzing different sets of observations, it may be identified that different types of systems take different amounts of time to test and/or burn. System requiring similar times may then be grouped together so that they can be burned simultaneously in a batch. This grouping of service tags into a group having similar expected test and/or burn times is referred to herein as unit classification.

In some cases, a statistical analysis of the time required for testing and/or burning previous embodiments of a given configuration of information handling system may be performed. For example, a large standard deviation in the time required for some particular configuration may indicate unpredictability, and this may then be taken into account when planning for testing and/or burning machines of that configuration.

Additionally, various correlations between test times and/or burn times may give further information. For example, as one of ordinary skill in the art with the benefit of this disclosure will appreciate, calculation of Pearson correlation coefficients (e.g., pairwise for each pair of data sets) may allow exploration of such correlations and provide improved estimates for predicted burn time. An equation for calculating the Pearson correlation coefficient for two quantities x and y is given by:

$$r_{xy} = \frac{\sum_{i=1}^{n}(x_i - \bar{x})(y_i - \bar{y})}{(n-1)s_x s_y}$$

where $\bar{x}$ and $\bar{y}$ are the means of x and y, and where $s_x$ and $s_y$ are the standard deviations.

Figure 3:
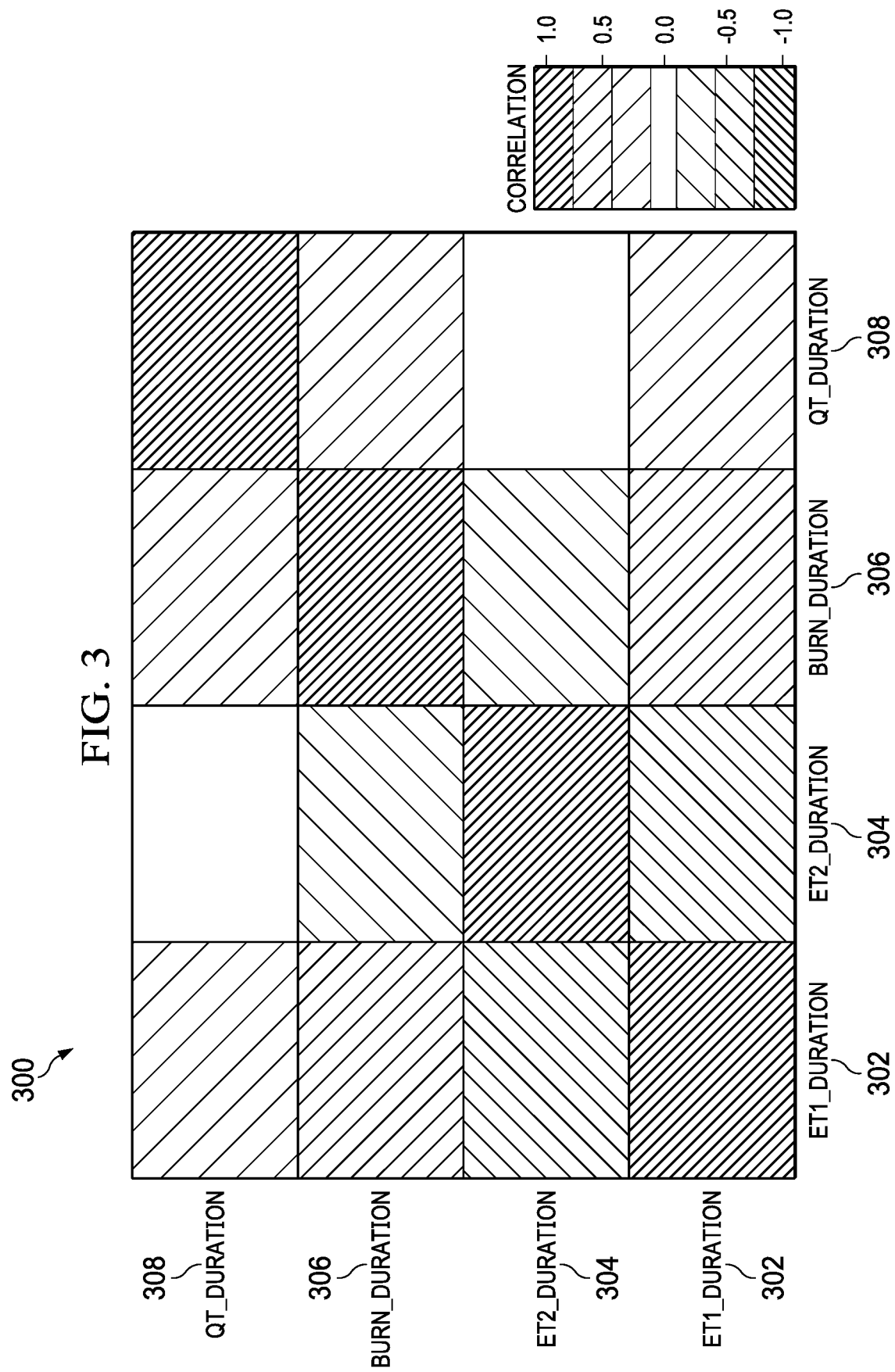
FIG. 3 illustrates an example heat map showing statistical correlations, in accordance with embodiments of the present disclosure.

Turning now to FIG. 3, a heat map 300 of Pearson correlation coefficients is shown for an example data set. As shown, for this example data set, the burn duration correlates positively with the duration of extended test 1, negatively with the duration of extended test 2, and only slightly with the duration of the quick test. (The correlations along the diagonal are of course equal to 1.) Heat maps such as example heat map 300 may provide a novel way of studying burn duration patterns across all unit classifications, allowing more accurate predictions of burn time and more efficient utilization of burn racks.

For example, with the knowledge that extended test 1 duration correlates positively with burn duration, a linear regression allows for calculation of an estimated burn time for a system, given the time that it required for extended test 1. FIG. 4 provides a plot of an example linear regression 400. Similar regressions may be run for other test suites as well, such as for extended test 2 and quick test. Thus, multiple estimates for a predicted burn time may be calculated based on these multiple linear regressions (or other types of regressions). In various embodiments, these multiple estimates may be averaged, or the historically most reliable estimate may be selected. In other embodiments, a more sophisticated model may be constructed to determine the predicted burn time by combining the various estimates in other ways.

In some cases, a large amount of noise may be present in high-dimensional data sets. To discard unhelpful features and help build more generalized models, feature selection techniques may be used to seek a reduced subset of features that improve the performance of the learning algorithm. Heat map based feature selection algorithms may be used to estimate the importance of a feature based on its interaction with different variables such as ET1, ET2, QT, and burn time.

In some embodiments, a problem may arise in which data becomes sparse in a high-dimensional space, which may cause issues with algorithms that are not designed to handle such complex spaces. To achieve the goal of dimensionality reduction, techniques such as principal component analysis (PCA) may be employed. The feature extraction approach seeks to transform the high-dimensional features into a whole new space of lower dimensionality by a linear combination of the original set of features.

With all of this in mind, a burn scheduling algorithm may be devised. This may be constructed as a batch processing algorithm where each burn request is assigned a priority. Arrival sequence may be decided based on standard deviation, predicted burn time, predicted test time, order quantity, manufacturing build time, and existing unit classifications with higher priorities.

While determining an arrival time at a burn rack, the system may consider estimated potential new locations in the rack as they become available, and uncertainty figures may be propagated forward in such estimates. This uncertainty may be based in part on the standard deviation of test times, as discussed above. Once a scatter plot is defined, the system may filter out any outlier units that took far longer or far shorter amounts of time than the rest of the data set. All of these outliers may be examined to identify influencing factors, such as failures (e.g., test failures or build failures) or patterns in previous or current processes.

Turning now to FIG. 5, table 500 is shown with an example set of burn priority data. In table 500, request ID is a unique identifier given to each request for a system to be burned. Classification name is shown in this example as a simple service tag identifier, but in other embodiments it may be an AI-based name given to systems having the same configuration (e.g., an identifier incorporating information about the particular line of business, family, OS type, OS part number, and physical configuration). Quantity refers to the order quantity that should be shipped together. Request time refers to the time when the factory planning application released an order to be built. Facility ship time refers to the time when the system is supposed to be shipped out from the factory. Predicted test time refers to the total predicted amount of time for all tests to complete, based on the classification name. Predicted burn time refers to the predicted amount of time for burning to complete, based on the classification name. Test/burn fail count is a representation of the total number of failures, and may be incremented whenever failure notifications are received. Expected burn end time on rack refers to the predicted finish time for the burn, and may be calculated both for units which are actually connected to the burn rack, as well as units which are still in the planning stage.

Expected burn time may be calculated as the sum of the predicted test time and the predicted burn time. Burn stage time may be recalculated if the system receives any failure notification from test or burn system.

As noted in table 500, the expected test time and expected burn time may be augmented to take into account the standard deviations of those quantities. For example, if a particular configuration has a large standard deviation in its burn time, this may be an indication that a large amount of "buffer" time should be added to its expected burn time to account for the uncertainty. In some embodiments, this may be addressed by adding the standard deviation to the respective quantity.

Further, in the embodiment of table 500, burn priority may be set based on the predicted total amount of time (build time, burn time, and test time) that a system is expected to take. The longer that total amount of time is, the sooner the system should begin burning. Thus the burn priority column of table 500 is calculated. For example, in this instance, request R1 has the highest priority because it is expected to take the largest total amount of time.

In addition to determining an improved priority order for burn requests, some embodiments of this disclosure may also assist in planning which locations in a burn rack should be used by which systems.

Figure 6:
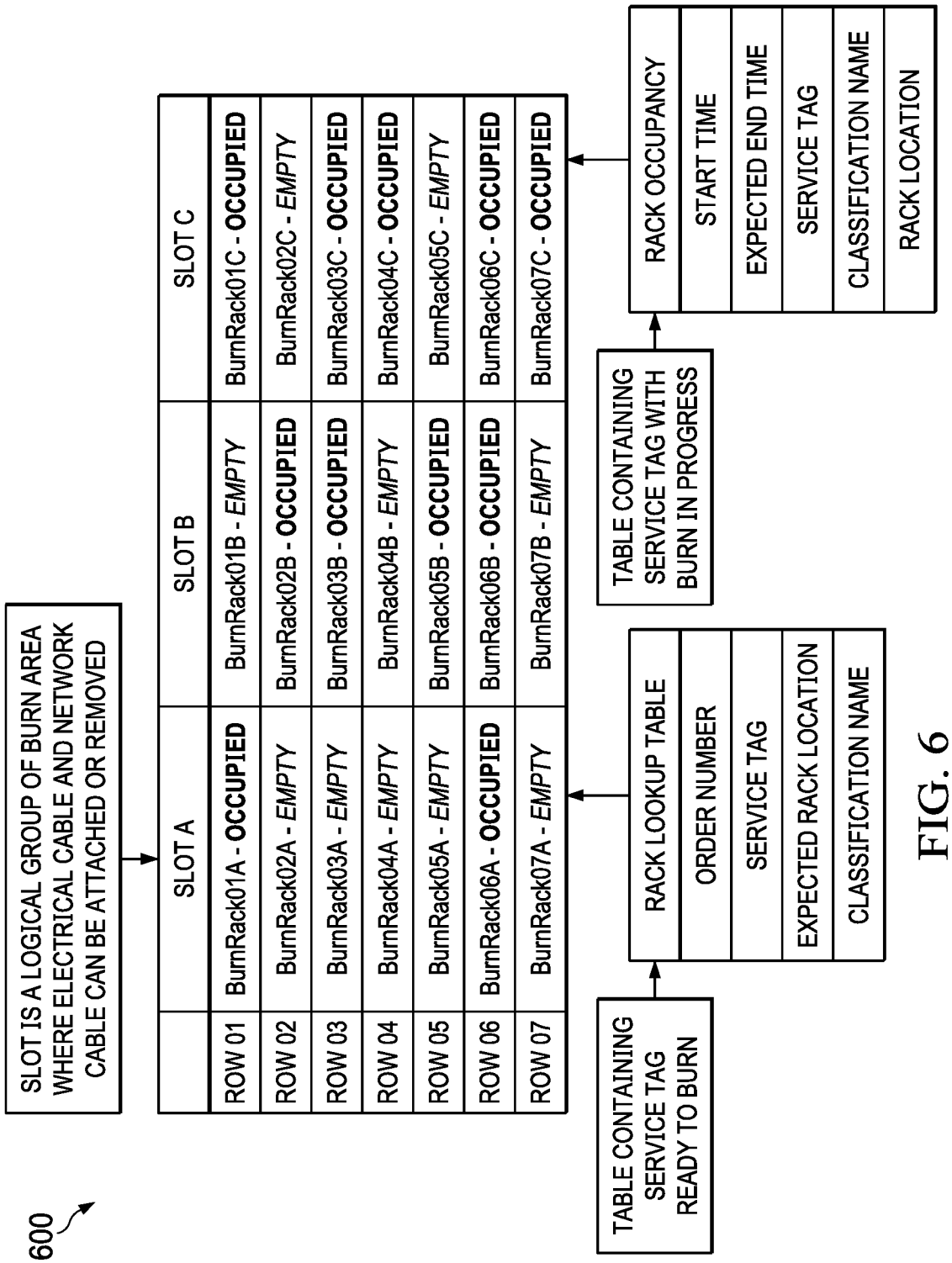
FIG. 6 illustrates a block diagram of an example set of burn rack locations, in accordance with embodiments of the present disclosure.

Turning now to FIG. 6, an annotated table 600 is shown, providing an example set of locations in a burn rack. As shown, each location in the burn rack may be associated with an entry in a data table: for empty locations, a rack lookup table may provide information on a system ready to burn; and for occupied locations, a rack occupancy table may provide information on the system that is being burned.

Various algorithms for populating racks may be used, in various embodiments.

In some embodiments, a partitioned allocation algorithm may be used. This may include creating logical groups based on expected burn completion time. When one or more rack locations are free within a slot to accommodate a new burn request, this grouping may be used by priority scheduling algorithm to plan against demand. FIG. 7 provides an annotated table 700, in which free locations are shown in white, and occupied locations are shown darkened.

In these and other embodiments, a best rack match algorithm may be used. This may include a process to allocate a burn request (e.g. R1 from table 500) into a selected rack space by determining the number of units that fit into either an available rack space or an occupied rack space. (Allocating units into an occupied rack space may add the expected burn completion time of the current burning-in-progress unit to the total burn time.) If the unit's total time is within the desired facility ship time, priority may be is assigned to the burn request.

In these and other embodiments, a placement algorithm may be used. This may include a rack allocation algorithm that searches for high-priority requests and matches them against available free slots based on classification need. In this algorithm, the rack allocator may keep track of free slots, and upon receiving a request for burn planning, may scan through the list for the best slot that is large enough to satisfy the request. If the chosen slot is significantly larger than that requested, the remainder may be added to another free slot.

Various embodiments of this disclosure may provide many benefits. For example, system with the same or similar burn time may be planned together, reducing dwell time in burn racks. Further, defining an order classification based on test and burn time may influence order capacity planning. Further, the use of a real-time progress feed from testing and burning systems may reduce dwell time in case of failure.

In these and other embodiments, software burning for large order quantities may be planned in a single batch or multiple batches, depending on availability. Service tags from the same order may be put near to one another in a rack for burning, which may help an operator to easily pick all service tag in a given order for shipment.

The described reductions in burn time may in turn reduce the overall end-to-end manufacturing cycle time.

Embodiments of this disclosure may provide end users flexibility for addition of priority orders to initiate burn process. Further, real-time information may be collected automatically and continually, which may help in discrete-event simulation and burn performance.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor; and
a memory communicatively coupled to the processor;
wherein the information handling system is configured to:
receive, for each of a plurality of target information handling systems, information regarding software to be burned to the respective target information handling system;
receive, for each of the target information handling systems, information regarding testing time;
based on a statistical analysis of the information regarding the testing time, determine a predicted burn time for each target information handling system, wherein the statistical analysis includes an indication that the predicted burn time is correlated with a selected testing time;
determine a standard deviation for at least one of the predicted burn time or the selected testing time; and
based on the respective predicted burn times, determine a desired order in which the target information handling systems are to be burned with the software based on a sum of the standard deviation with the respective at least one of the predicted burn time or the selected testing time, wherein the desired order is determined such that systems having similar predicted burn times are burned concurrently.

2. The information handling system of claim 1, wherein the desired order is further based on an indication that a particular one of the target information handling systems is associated with a high business priority.

3. The information handling system of claim 1, wherein the correlation is a positive correlation.

4. The information handling system of claim 1, wherein the correlation is a negative correlation.

5. The information handling system of claim 1, wherein the information handling system is further configured to determine desired locations in a burn rack for the target information handling systems.

6. A method comprising:
an information handling system receiving, for each of a plurality of target information handling systems, information regarding software to be burned to the respective target information handling system;
the information handling system receiving, for each of the target information handling systems, information regarding testing time;
based on a statistical analysis of the information regarding the testing time, the information handling system determining a predicted burn time for each target information handling system, wherein the statistical analysis includes an indication that the predicted burn time is correlated with a selected testing time;
the information handling system determining a standard deviation for at least one of the predicted burn time or the selected testing time;
based on the respective predicted burn times, the information handling system determining a desired order in which the target information handling systems are to be burned with the software based on a sum of the standard deviation with the respective at least one of the predicted burn time or the selected testing time, wherein the desired order is determined such that systems having similar predicted burn times are burned concurrently; and
the information handling system causing the target information handling systems to be burned in the desired order.

7. The method of claim 6, wherein the desired order is based on a total predicted amount of time for testing and burning each respective target information handling system.

8. The method of claim 7, wherein longer total predicted amounts of time are associated with earlier burn times in the desired order.

9. An article of manufacture comprising a non-transitory, computer-readable medium having computer-executable code thereon that is executable by a processor of an information handling system for:
receiving, for each of a plurality of target information handling systems, information regarding software to be burned to the respective target information handling system;
receiving, for each of the target information handling systems, information regarding testing time;
based on a statistical analysis of the information regarding the testing time, determining a predicted burn time for each target information handling system, wherein the statistical analysis includes an indication that the predicted burn time is correlated with a selected testing time;
determining a standard deviation for at least one of the predicted burn time or the selected testing time; and
based on the respective predicted burn times, determining a desired order in which the target information handling systems are to be burned with the software based on a sum of the standard deviation with the respective at least one of the predicted burn time or the selected testing time, wherein the desired order is determined such that systems having similar predicted burn times are burned concurrently.

10. The article of claim 9, wherein the desired order is further based on an indication that a particular one of the target information handling systems is associated with a high business priority.

11. The article of claim 9, wherein the correlation is a positive correlation.

12. The article of claim 9, wherein the correlation is a negative correlation.

13. The article of claim 9, wherein the code is further executable for:
determining desired locations in a burn rack for the target information handling systems; and
causing the target information handling systems to be burned in the desired order in the desired locations.

* * * * *